United States Patent

Christine et al.

[15] 3,694,997

[45] Oct. 3, 1972

[54] FOOD PACKAGING MACHINE WITH SYNCHRONIZED DRIVE MECHANISM

[72] Inventors: William C. Christine, Catasauqua; Joseph E. Pierce, Allentown, both of Pa.

[73] Assignee: A. E. J. Corporation, Bethlehem, Pa.

[22] Filed: July 10, 1970

[21] Appl. No.: 53,947

[52] U.S. Cl. .................... 53/112 R, 53/167, 53/282
[51] Int. Cl. ........................ B65b 3/00, B65b 31/02
[58] Field of Search ...... 53/37, 281, 282, 167, 112 R; 141/85, 89, 91; 198/106

[56] References Cited

UNITED STATES PATENTS

| | | | |
|---|---|---|---|
| 3,503,182 | 3/1970 | Phipps | 53/282 |
| 3,336,722 | 8/1967 | Van der Winden | 53/37 |
| 3,319,397 | 5/1967 | Lupovici | 53/282 |
| 3,527,020 | 9/1970 | Mancini | 53/282 |
| 2,897,643 | 8/1959 | Byrd | 53/281 |
| 3,267,971 | 8/1966 | Mueller | 53/37 X |
| 3,440,794 | 4/1969 | Mueller | 53/37 |
| 3,478,489 | 11/1969 | Meisner | 53/167 |

*Primary Examiner*—Robert L. Spruill
*Attorney*—William C. Conner and Curtis, Morris & Safford

[57] ABSTRACT

Apparatus for packaging food products and including mechanism for dispensing containers onto an endless conveyor, filling the containers with flowable material, placing a cover on the filled containers, sealing the cover to the container, and discharging the sealed containers from the machine. All of the individual mechanisms are driven from a single source of power so that all of such mechanisms will be synchronized and will remain in time relationship with each other at all times. Also, novel means are provided for discharging filled and capped containers from the endless conveyor. The discharge means include a container raising cam, a notched receiver plate, a pair of fixed support rods and means for reciprocating the receiver plate to discharge containers from the conveyor onto the support rods.

7 Claims, 17 Drawing Figures

INVENTORS
WILLIAM C. CHRISTINE
JOSEPH E. PIERCE

BY Sherman Levy ATTORNEY

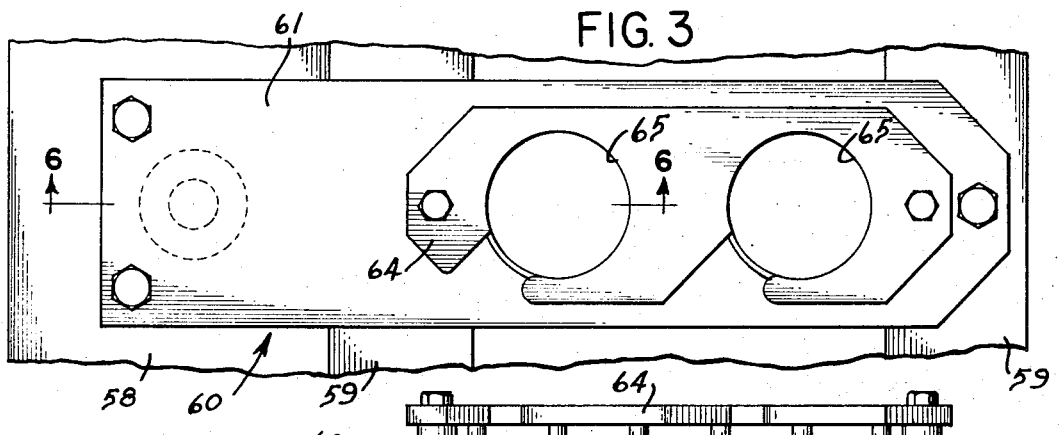
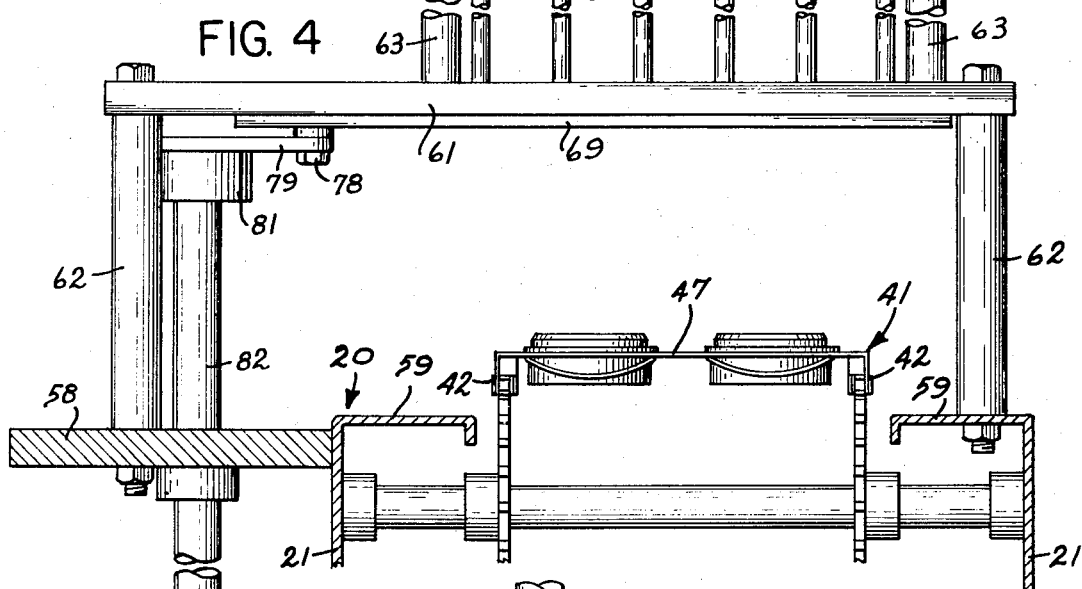
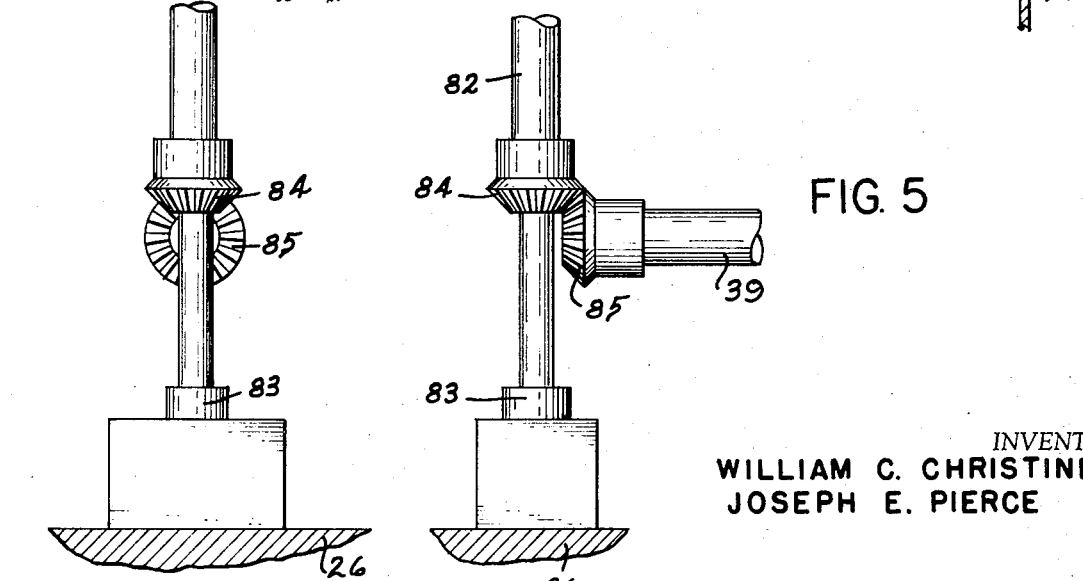

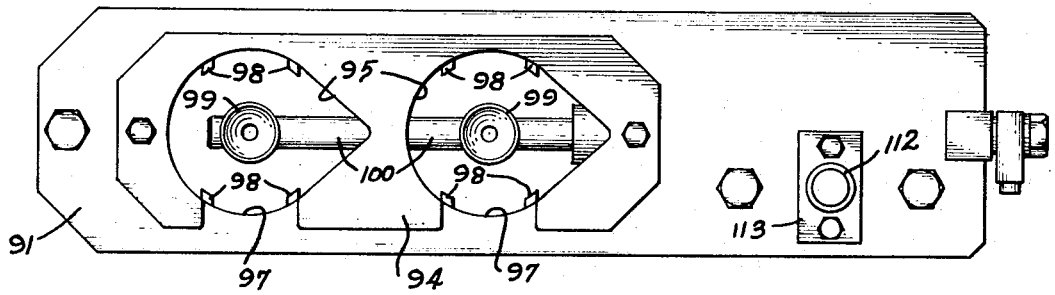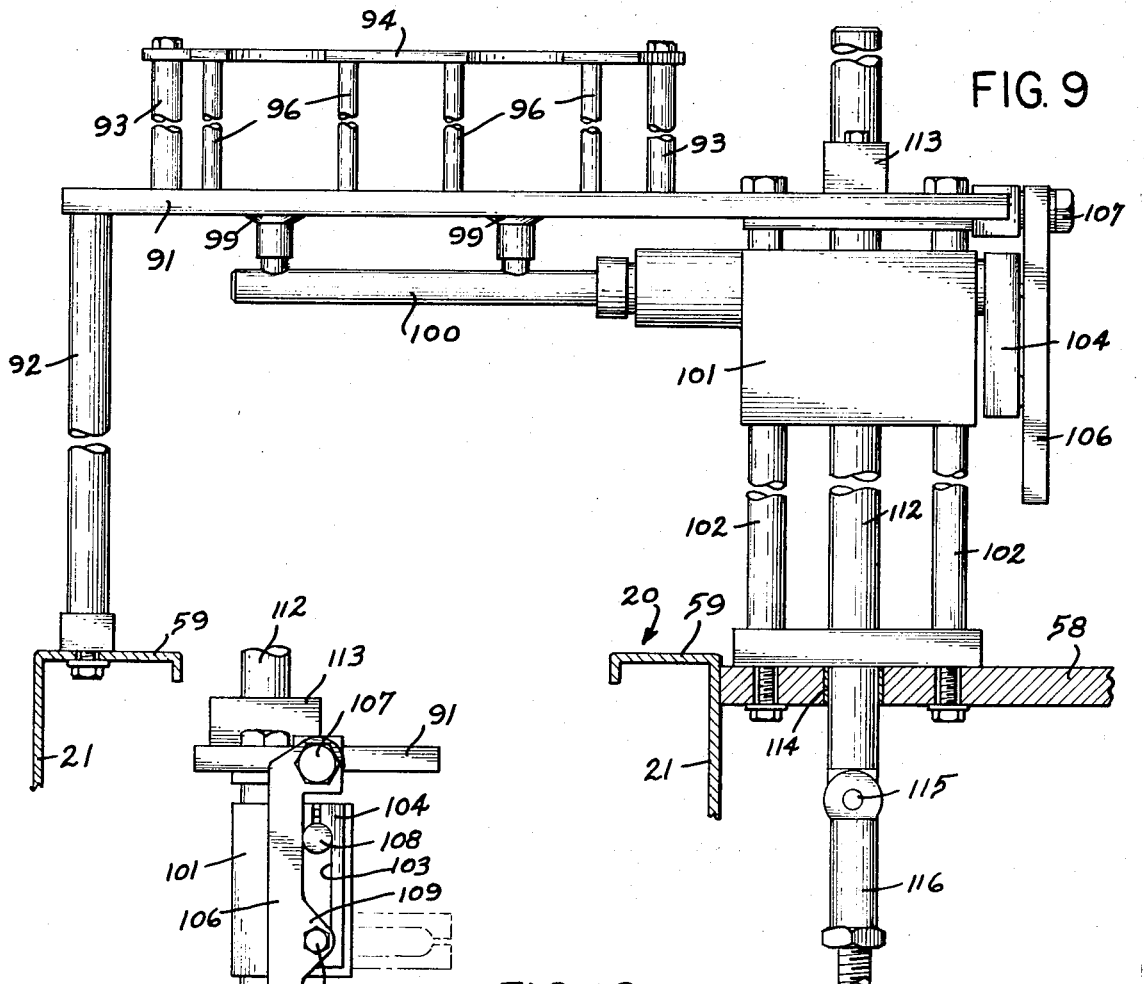

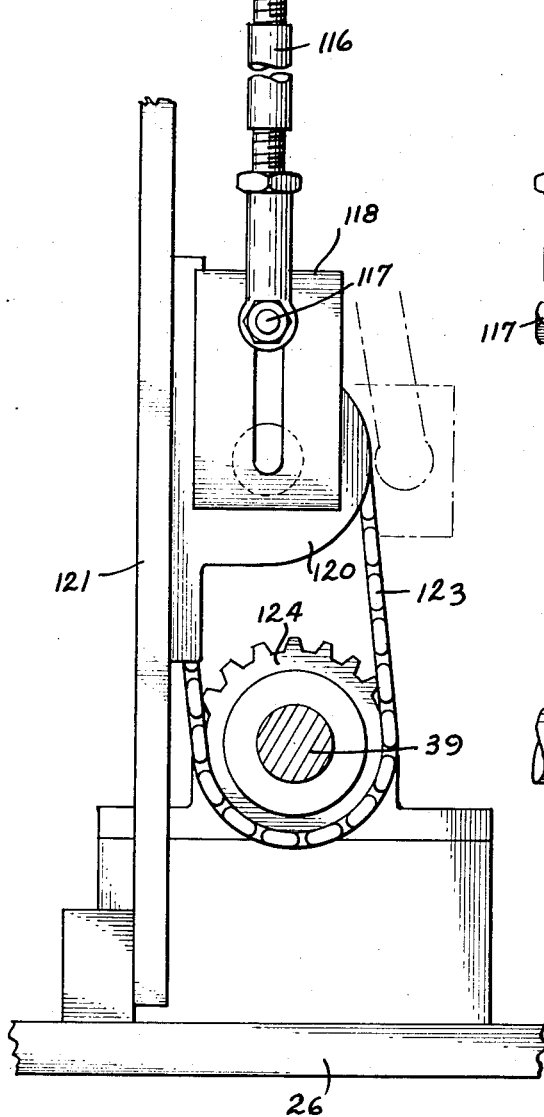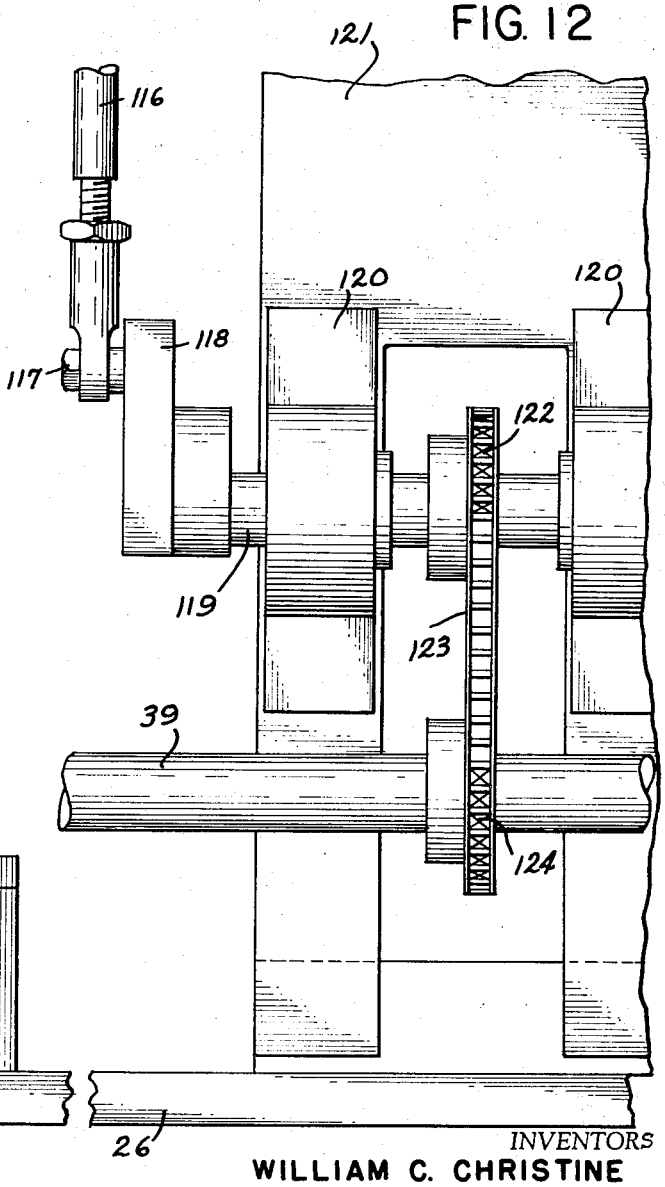

3,694,997

INVENTORS
WILLIAM C. CHRISTINE
JOSEPH E. PIERCE

BY

Sherman Levy  ATTORNEY

INVENTORS
WILLIAM C. CHRISTINE
JOSEPH E. PIERCE

BY

Sherman Levy   ATTORNEY 3,694,997

FOOD PACKAGING MACHINE WITH SYNCHRONIZED DRIVE MECHANISM

BACKGROUND OF THE INVENTION

1. Field of the Invention

This invention relates generally to food and drug packaging machinery of different kinds and relates particularly to machinery for packaging flowable food products in liquid, semi-liquid, granular or powdered form in which containers are dispensed, filled, covered and sealed automatically in a minimum of time and in a substantially continuous operation.

2. Description of the Prior Art

Heretofore many efforts have been made to provide machinery for packaging of various food products automatically, however these prior art devices have not been satisfactory because they have been too expensive to manufacture and maintain, and have been driven by multiple sources of power and therefore have been difficult to maintain in synchronization, and required skilled operators and have presented problems of cleanliness and sanitation so that the devices have not been completely satisfactory for handling foods and drugs; and for other reasons have not served the purposes for which they were intended.

SUMMARY OF THE INVENTION

The present invention is a food packaging machine having an endless conveyor with upper and lower generally horizontal runs which conveyor is operated automatically in an intermittent step by step or continuous manner. The conveyor includes a plurality of flights adapted to be moved in relation to a position below a container dispenser where containers are discharged into openings in each flight after which the conveyor moves the containers to a position below a food dispensing mechanism which discharges a predetermined quantity of flowable food product into each container after which a cover is placed on each container and is sealed thereon and then the containers are discharged from the machine. After the containers are discharged, the lower run of the conveyor is immersed in a cleaning solution or other cleaning agent to clean and sterilize the flights.

An object of the invention is to provide a food packaging machine in which all of the various elements are driven in synchronism from each other with a common source and in which the flights of the conveyor are cleaned and sanitized prior to receiving the containers and the food product.

Still another object of the present invention is to provide a packaging machine that includes a container dispenser, a product filler mechanism, a variable speed control, a lid dispenser, sealing heater or mechanical lid sealer and an off-loader mechanism. In addition, the present invention is versatile and will fill the containers with liquids, semi-liquids, solids and jells at high speeds and the machines will fill the containers with product with precision control. Also, design flexibility permits the use of pre-formed containers of varying size, shape and construction. Additional rows may be added to increase production capacity as desired.

Still another object of the present invention is to provide a packaging machine that will automatically cap the containers with pre-cut lids, then hermetically seal the lids on to the containers, and wherein a minimum amount of personnel is required to operate the machine.

Still another object of the present invention is to provide a packaging machine that is constructed so that sterilization can be accomplished, and wherein agitation can be used in the filling operating, and wherein the trays can be handled without being touched by human hands, and wherein there is provided a novel take-off arrangement as well as a programmer circuit, the present invention permitting a variety of configurations of containers to be handled, and wherein various types of off-loading can be used. In addition, there is provided a novel flight configuration as well as a sanitizing bath for the conveyors, and wherein the parts can be easily cleaned and dried when in place. Also there is provided a means for maintaining flight alignment, and a heat sealing station with a spring mounting that provides a uniform mounting means, and there is a floating action for the individual heat sealing heads. Also, a shroud can be used on the machine if desired or required for supporting an aseptic arrangement, or an inert gas flush. Further the present invention has variable timing features at each station.

Another object is to provide an apparatus of the character described that may be utilized speedily and with precision by even inexperienced operators.

Further objects and advantages are to provide improved elements and arrangements thereof in a device of the character described that is economical to produce, durable in form, and conducive to the most economical use of materials and uniformity of members formed therefrom.

Still further objects and advantages will become apparent in the subsequent description in the specification.

BRIEF DESCRIPTION OF THE DRAWING

FIG. 3 is an enlarged top plan view of the container dispensing mechanism.

FIG. 4 is a side elevation thereof.

FIG. 5 is a fragmentary side elevation of the drive mechanism for the container dispenser.

FIG. 8 is a top plan view of the cover dispensing mechanism.

FIG. 9 is a side elevation thereof.

FIG. 10 is an elevation of the drive mechanism for the cover dispenser.

FIG. 12 is a front elevation thereof.

Figure 1:
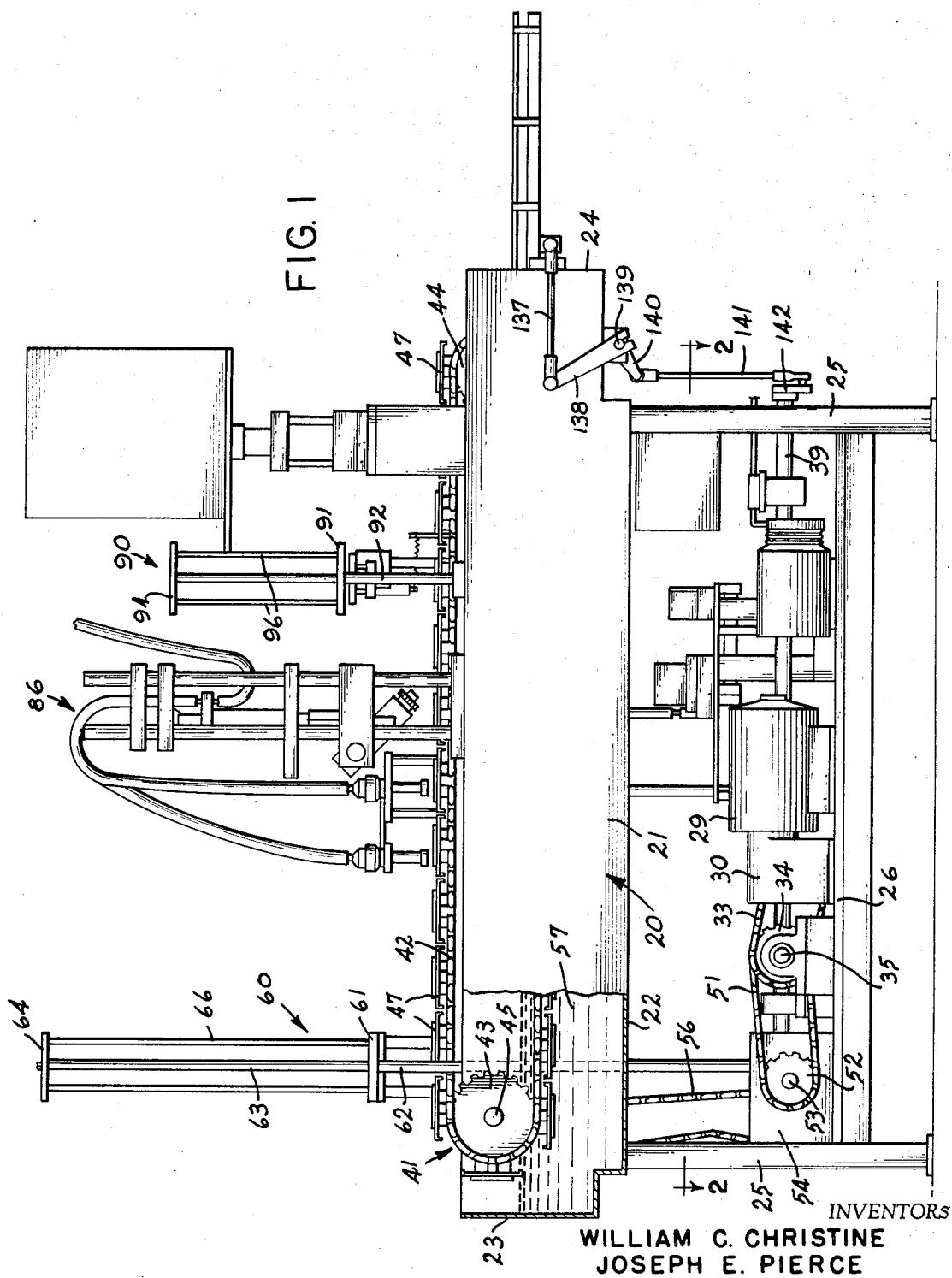
FIG. 1 is a side elevation illustrating one application of the invention.
Figure 2:
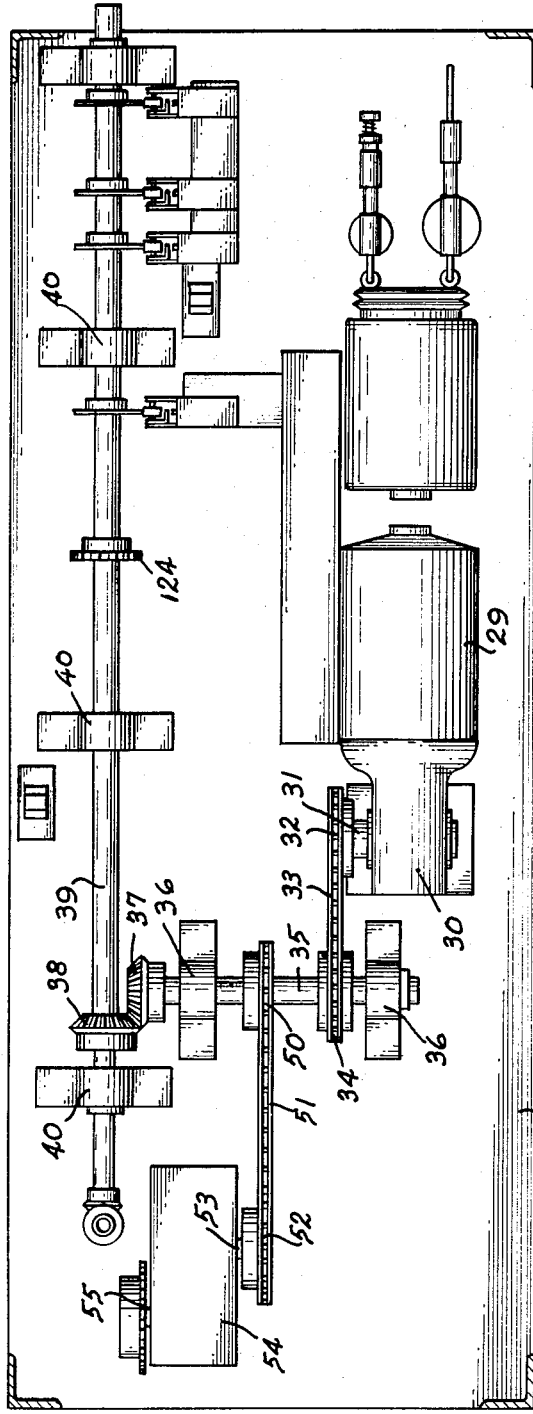
FIG. 2 is an enlarged section on the line 2—2 of FIG. 1.

With continued reference to the drawings, a generally hollow body or tank 20 is provided having side walls 21, a bottom wall 22 and end walls 23 and 24. The end wall 23 extends upwardly substantially the full height of the side walls 21 and the end wall 24 terminates a substantial distance below the top of the side walls 21 for a purpose which will be described later. The tank 20 is supported in a desired manner as by legs 25 which, as shown, are constructed of angle members.

A platform or lower deck 26 is located below the tank 20 and such platform is connected to the legs 25 in any desired manner as by welding and the like. A power plant 29 such as an electric motor, internal combustion engine or the like is mounted on the platform 26, and such power plant drives a gear reduction unit 30 having an output shaft 31 on which a sprocket 32 is mounted. The sprocket 32 drives a chain 33 and such chain drives a sprocket 34 fixed to a transfer shaft 35 journaled in bearings 36 mounted on the platform 26. On one end of the transfer shaft 35 is a bevel gear 37 which meshes with and drives a bevel gear 38 fixed to a drive shaft 39. Such drive shaft is rotatably supported by a plurality of bearings 40 on the platform 26 and such drive shaft extends substantially the full length of the platform. Within the tank 20 an endless chain type conveyor 41 is provided having a pair of chains 42 extending around spaced pairs of drive and driven sprockets 43 and 44, respectively. The pair of drive sprockets 43 are affixed to a shaft 45 at one end of the tank 20 and the pair of driven sprockets 44 are fixed to a shaft 46 at the opposite end of such tank. The chains 42 are spaced apart a predetermined distance and are connected together by a plurality of flights 47 having openings therein for the reception of containers to be filled.

In order to drive the conveyor 41 a sprocket 50 is mounted on the transfer shaft 35 and such sprocket drives a chain 51 which in turn drives a sprocket 52 mounted on the input shaft 53 of a reduction unit 54. A sprocket 55 is mounted on the output shaft of the reduction unit and such sprocket drives a chain 56 which in turn drives a sprocket (not shown) connected to the shaft 45 to drive the conveyor 41. Preferably the output shaft of the reduction unit 54 is operated in intermittent timed relation in any conventional manner (not shown) so that the conveyor 41 will be advanced step by step. The upper run of the conveyor 41 is disposed above the tank 20 while the lower run of the conveyor is immersed in a cleaning solution or liquid cleaning agent 57 (FIG. 1) to clean the flights 47 by removing any drippage or spillage of food product therefrom and sterilizing such flights.

A ledge or shelf 58 extends outwardly from one of the side walls 21 and preferably each of the side walls is provided with an inwardly extending flange 59. As illustrated in FIGS. 1 and 3, a container dispenser unit 60 is disposed above the tank 20 and is arranged generally transversely of such tank. The container dispenser unit includes a base plate 61 supported by upright posts 62 fixed to the ledge 58 and one of the flanges 59. The base plate 61 has spaced generally upright posts 63 supporting a top plate 64 at their upper ends. The top plate 64 is provided with a pair of openings 65 through which a stack of nested containers can be inserted. A plurality of bars 66 surround each of the openings 65 and extend downwardly to the base plate 61 to provide a frame for retaining the stacks of containers. The base plate 61 is provided with a pair of openings 67 in alignment with the openings 65 in the top plate so that the stack of containers can pass through the base plate.

Figure 6:
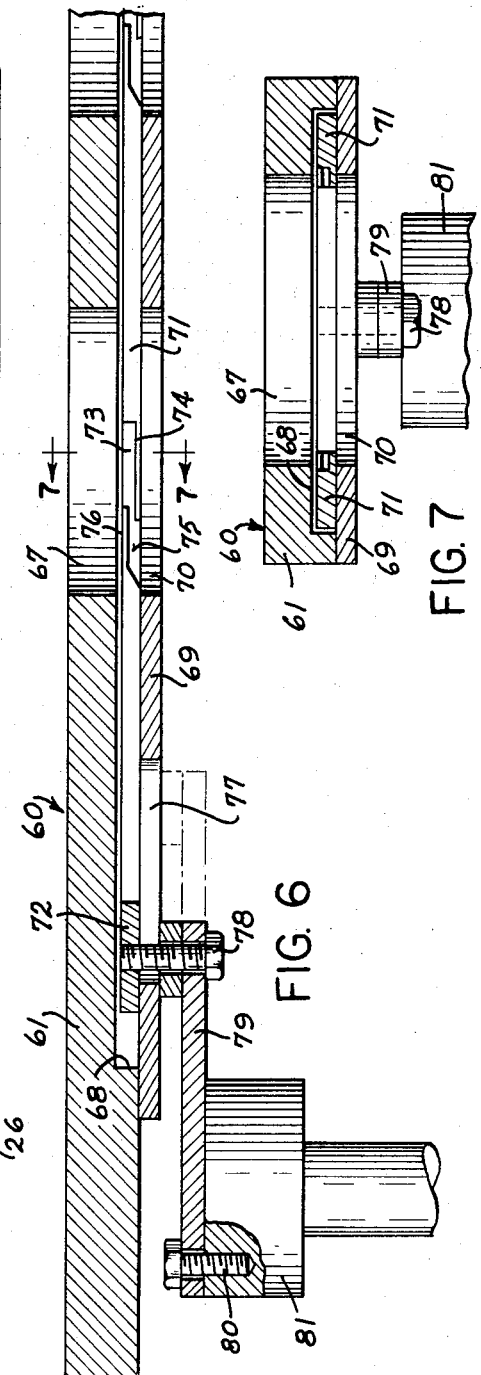
FIG. 6 is an enlarged section on the line 6—6 of FIG. 3.
Figure 7:
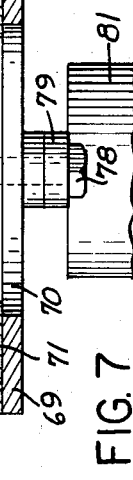
FIG. 7 is a section on the line 7—7 of FIG. 6.

As illustrated in FIGS. 6 and 7, the base plate 61 has a recess 68 which normally is closed by a cover plate 69 removably attached to the bottom of the base plate 61, and such cover plate is provided with openings 70 in alignment with the openings 67 and 65. In order to dispense one container at a time from each stack a pair of generally parallel slide bars 71 are slidably mounted within the recess 68 and are connected at opposite ends by a cross bar 72. To dispense one cup at a time from each stack, the slide bars 71 extend inwardly into the path of travel of the stacks of containers. Each of the slide bars is provided with a notch or recess 73 extending downwardly from the upper surface and terminating at a ledge 74. A second notch or recess 75 extends upwardly from the bottom surface of each of the slide bars in lateral spaced relation with the notch 73, and such notch 75 terminates in a ledge 76. The notches 73 and 75 are in communication with each other, as illustrated in FIG. 6. Each of the containers is provided with an upper flange so that the stock of containers will pass through the openings 67 and 70 and the flange of the lowermost container will rest upon the ledge 74 while the flange of the next lowermost container will be disposed above the ledge 76. When it is desired to dispense one container from each of the stacks, the slide bars 71 will move toward the right, as illustrated in FIG. 6, so that the flange of the lowermost cup will move through the communicating opening between the notches 73 and 75 until the flange clears the ledge 74, at which time the lowermost cup can fall by gravity into the openings in the flights 47 located therebelow. The movement of the slide bars in the first direction will cause the upper ledge 76 to move under the flange of the next lowermost container and prevent the dispensing of more than one container at a time. When the slide bars are retracted the ledge 76 will be moved from beneath the flange of the next lowermost container and permit the stack to drop by gravity until the flange rests upon the ledge 74.

In order to move the slide bars 71, the cover plate 69 is provided with an elongated slot 77 through which a screw or other fastener 78 extends and threadedly engages one of the cross-bars 72. The screw 78 is freely rotatably carried by one end of a link 79 and the opposite end of such link is freely rotatably connected to an eccentric 81 carried by a shaft 82. To drive the eccentric 81, the lower end of the shaft 82 is rotatably mounted within a thrust bearing 83 carried by the platform 26. A bevel gear 84 is fixed to the shaft 82 in a position to mesh with a cooperating bevel gear 85 fixed to one end of the drive shaft 39 so that when the drive shaft is operated, the eccentric 81 will be rotated and the link 79 will extend and retract the slide bars 71. With this construction one container will be dispensed from each stack of the cup dispenser unit each time the conveyor 41 is advanced one step.

With reference to FIG. 1, after the containers have been dispensed within the openings in the flights 47 such containers are advanced to a filling station 86 where such containers are filled with a predetermined amount of food product in liquid, granular or powdered form in a manner similar to our co-pending application "Apparatus for Dispensing Viscous Material," U.S. Ser. No. 846,742.

After the containers have been filled they are advanced to a lid dispenser unit 90 where a lid is placed on each of the containers. As illustrated in FIGS. 8 – 12, the lid dispenser unit is located above the tank 20 and generally transversely thereof. Such lid dispenser unit includes a base plate 91 supported by posts 92 carried by the ledge 58 and one of the flanges 59. A plurality of upright posts 93 extend upwardly from the base plate 91 and support a top plate 94 having a pair of openings 95 surrounded by bars 96 extending between the base plate 91 and the top plate 94 to retain a pair of stacks of container lids in alignment with each other. The base plate 91 is provided with a pair of openings 97 in alignment with the openings 95 and in alignment with the openings 21 in the flights 47, and each of such base plate openings 97 is provided with a plurality of inwardly extending lugs 98 which engage and support the stack of lids.

In order to remove one lid at a time from each of the stacks of lids, a pair of vacuum type suction cups 99 are mounted on a header 100 carried by a slide body 101 on rails 102. In the upper position a vacuum from any desired source is applied to each of the cups 99 to create a suction on such cups so that when the slide body 101 is lowered the lowermost lid will be pulled over the lugs 98 and separated from the stacks.

When the cups are being lowered it is necessary to reverse the direction of the header 100 so that the lids will be deposited on the containers carried by the conveyor 41. In order to do this, the end of the header remote from the cups 99 extends through the slide body 101 and is disposed within a slot 103 of a block 104 swingably mounted by a pivot 105 on an arm 106. One end of the arm 106 is swingably mounted by a pivot 107 to the base plate 91. A roller 108 rotatably mounted on the header 100 engages one surface of the arm 106 and as the slide body 101 is lowered such roller is adapted to engage an enlargement or cam surface 109 on the arm 106.

When the roller strikes the cam surface 109, the arm 106 will be pivoted to the left as illustrated in FIG. 10 which will cause the block 104 to rotate about the pivot 105 and reverse the direction of the cups 99. In order to maintain the roller 108 in engagement with the arm 106, the lower end of the arm is connected by a spring 110 to a post 111 supported by a ledge 58. When the lids carried by the cups 99 are deposited on the containers the vacuum is relieved so that as the slide body 101 is again moved upwardly the lids will remain on the containers.

The slide body 101 is adapted to be moved up and down on the rails 102 by an elongated rod 112 extending through and fixed to the slide body 101 in any desired manner, and such rod 112 is carried by a bearing 113 mounted on the base plate 91 and a slide bearing 114 in the ledge 58. The lower end of the rod 112 is connected by a pivot 115 to one end of a connecting link 116 and the opposite end of such link is connected by a pivot 117 to an eccentric 118. The eccentric 118 is rotatably mounted on a shaft 119 carried by bearings 120 mounted on a support plate 121. A sprocket 122 is fixed to the shaft 119 and is adapted to be driven by a chain 123 from a sprocket 124 mounted on the drive shaft 39. Rotation of the drive shaft will cause rotation of the shaft 119 which in turn will move the rod 112 up and down.

After the lids have been deposited on the containers they may be hermetically sealed thereon in any desired manner as by a sealer unit 125.

Figure 14:
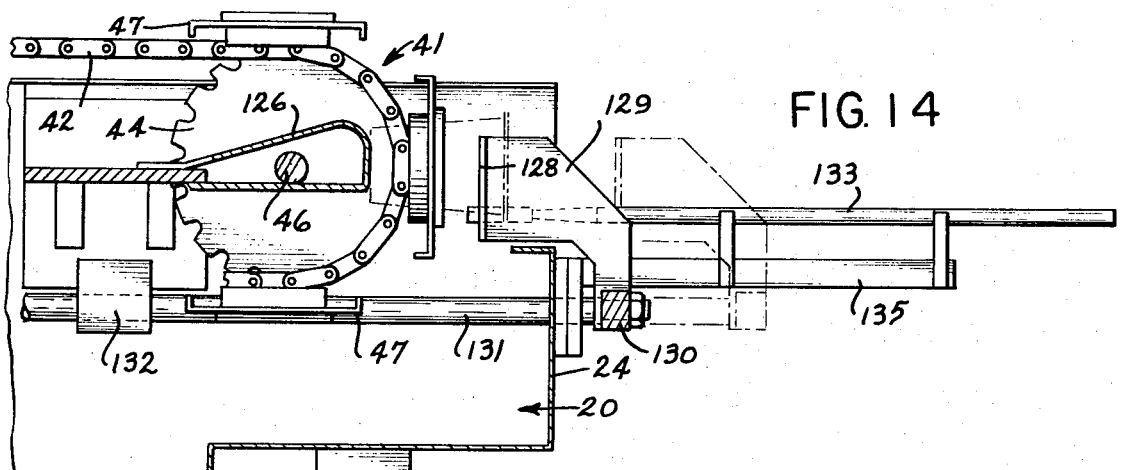
FIG. 14 is a section on the line 14—14 of FIG. 13.
Figure 13:
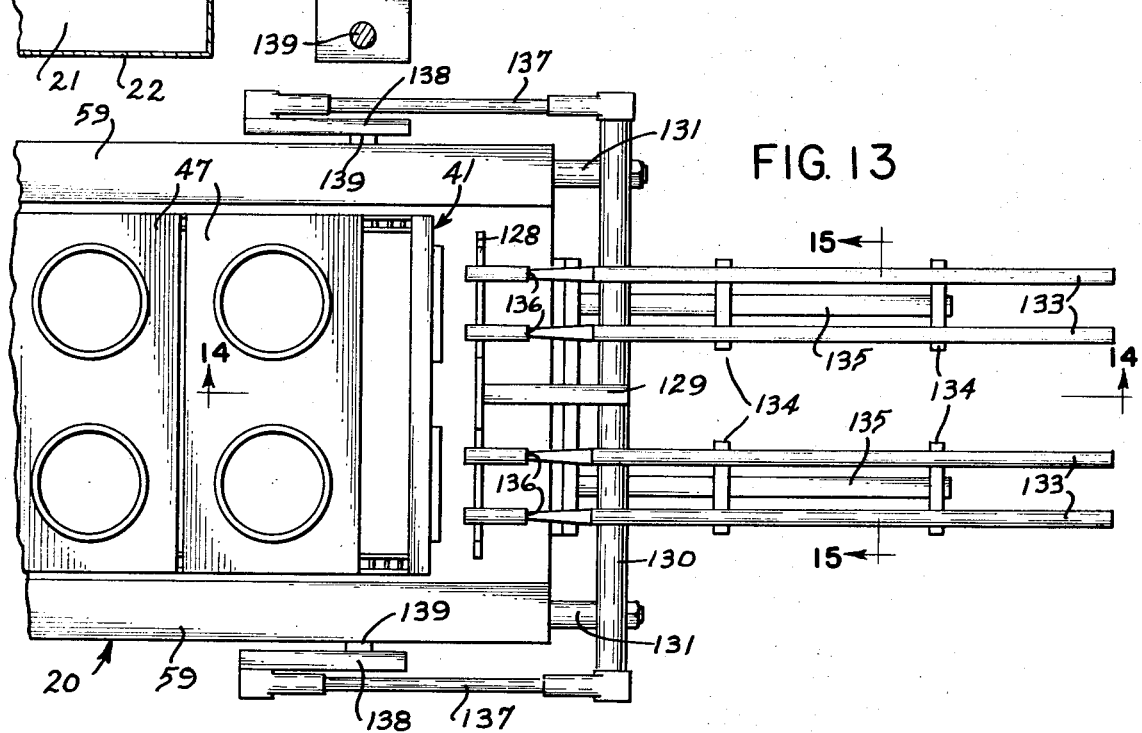
FIG. 13 is an enlarged top plan view of the discharge end of the machine.
Figure 15:
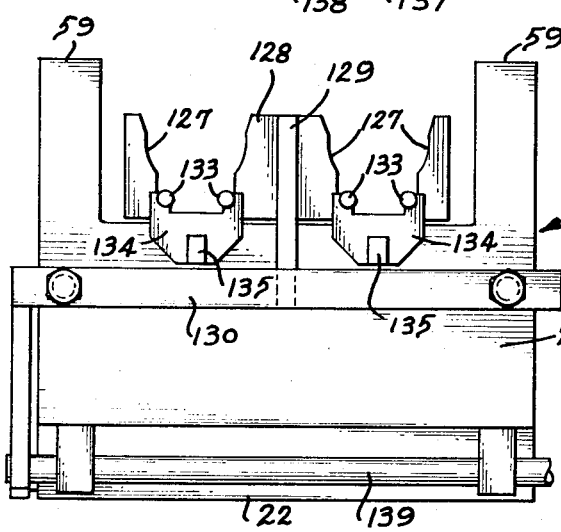
FIG. 15 is a section on the line 15—15 of FIG. 13.

With reference to FIGS. 13 – 15, after the lids have been sealed on the containers such containers are adapted to be discharged from the machine. In order to do this a container raising cam 126 is located between the sprockets 44 of the conveyor in a position that containers carried by the flights 47 will engage the raising cam 126 and will partially raised out of engagement with the flights 47. As the chains 42 travel around the sprockets 44 the raised containers will be received within a pair of notches 127 within a receiver plate 128. Such receiver plate is mounted on a tongue 129 carried by a cross bar 130 which in turn is supported by a pair of spaced rods 131 slidably mounted within bearings 132 disposed within the tank 20. A pair of fixed rails 133 are disposed within each of the notches 127. Each pair of rails is supported in fixed position by spacers 134 carried by a base rod 135 having one end attached to the tank 20. Each of the rails 133 is provided with a shoulder 136 for a purpose which will be described later.

In order to move the cross bar 130 to the position shown in phantom lines in FIG. 14 to remove containers from the flights 47, the opposite ends of such cross bar are pivotally connected to links 137, the opposite ends of which are pivotally connected to levers 138 fixed to opposite ends of a shaft 139. To rotate the shaft 139 so that the links 137 extend and retract the cross bar 130, an arm 140 is fixed to the shaft 139 and the opposite end of such arm is pivotally connected to one end of a connecting link 141, the opposite end of which is pivotally connected to an eccentric 142 mounted on the end of the drive shaft 39.

When the receiver cross bar 130 and the receiver plate 128 are moved outwardly to the position shown in phantom lines in FIG. 14, the containers will be removed from the openings in the flights 47 and the bottoms of such containers will be supported by the rails 123. The receiver plate 128 will move the containers a sufficient distance from the conveyor so that the bottom of the containers will pass the shoulders 136 of the fixed rails. When the receiver plate is retracted, the bottoms of the containers will engage the shoulders 136 and hold such containers on the rails.

Figure 16:
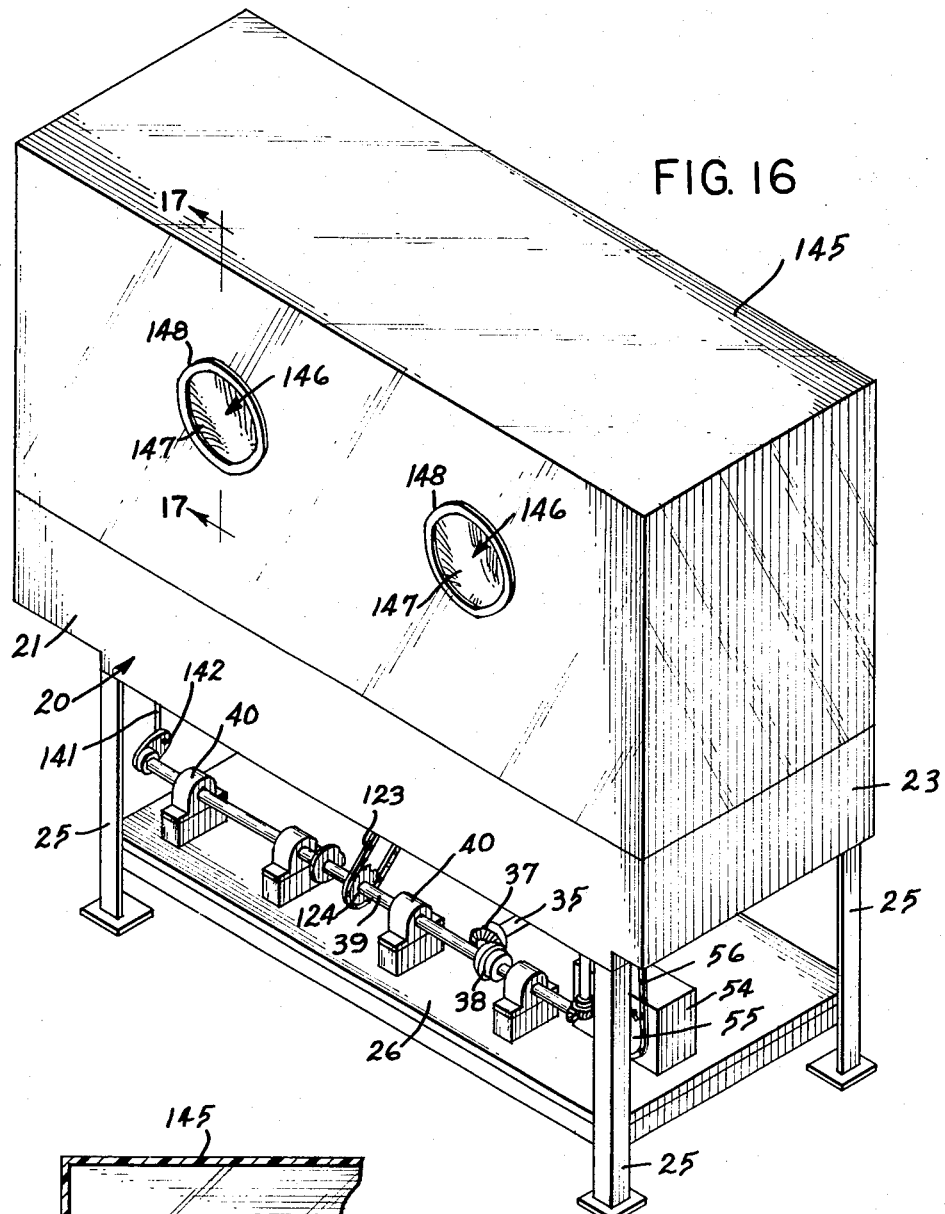
FIG. 16 is a perspective of a modified form of the invention and illustrating an air-tight cover to maintain the food product in sanitary condition.
Figure 17:
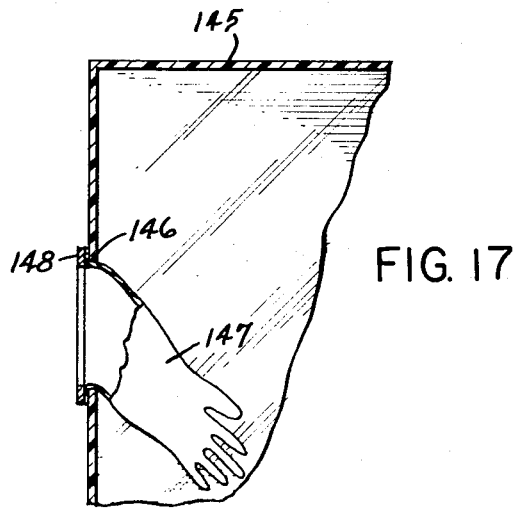
FIG. 17 is an enlarged section on the line 17—17 of FIG. 16.

As illustrated in FIGS. 16 and 17, a modified form of the invention is disclosed in which the tank 20, the cup dispenser unit 60, filling station 86, lid dispenser unit 90 and the sealer unit 125 are enclosed by an air-tight housing 145. Preferably the housing 145 is constructed of transparent material so that the automatic operation of the various elements can be observed at all times. The housing 145 is particularly useful when sterility of the product must be maintained and, if desired, an inert gas such as nitrogen or the like can replace the atmospheric air within the housing 145.

In order to permit an operator to make adjustments to the various mechanisms within the housing 145, one or more ports 146 may be provided in each side of the housing 145. Each of such ports is closed by a flexible gauntlet or glove 147 having its outer periphery clamped to the side wall of the housing 145 by a ring 148 or the like. With this construction, an operator on the exterior of the housing can insert his hands into the gloves which project into the housing and can make any necessary adjustments without disturbing the sterile condition of the apparatus or the product within the housing.

In the operation of the device one or more containers are dispensed into the openings in the flights 47 from the container dispenser unit 60 after which the conveyor 41 is advanced step by step until the conveyors are located beneath filling spouts of the filling station 86 where food product in liquid, granular or powdered form is discharged into each of the containers. It is noted that if desired a pair of filling nozzles may be provided for each row of containers so that each nozzle can dispense a desired portion of the food product into the container. Also such nozzles could be used to dispense two separate materials which are to be mixed at the time of packaging. Thereafter, the conveyor is advanced until the containers are located below the lid dispenser unit 90 where a lid is placed on each of the containers after which the conveyor carries the containers of a sealer unit 125 where the lids are hermetically sealed onto the containers. Then the containers are discharged from the apparatus onto the fixed rails 133. When the containers have been discharged, the lower run of the conveyor 41 is immersed in a cleaning solution which removes any spillage or drippage from the flights 47. The conveyor, container depositor unit, filling unit, lid dispenser unit, heater unit and discharge unit all are driven from a common drive shaft 39 so that of the various operations will be carried out in a timed sequence.

The machine can be enclosed so as to facilitate use of an inert atmosphere in packaging and, in addition to sterile air, the introduction of nitrogen or other gasses can be incorporated with the present invention. The machine permits sterilization of flights and a sterilizing liquid can be arranged in the tank. Also, a bubble device can be used that will permit scrubbing. The machine includes a tank that will permit sterilization of the flights and other parts, and the mechanism can be cleaned and sterilized without removal of the parts from the machine. The machine facilitates nitrogen packaging as well as packaging with carbon dioxide and the like.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

What is claimed is:

1. Apparatus for packaging food, drugs and other products, comprising tank means, an endless conveyor having upper and lower runs rotatably mounted in said tank means, said endless conveyor having a plurality of flights extending transversely of said tank means, each of said flights having at least one opening to receive a container to be filled, means for driving said conveyor, container dispenser means mounted above said tank means and adapted to receive at least one stack of containers, means for dispensing one container at a time from each stack, the dispensing container falling by gravity into the openings of said flights, means for introducing food products into said containers, lid dispensing means for placing a lid on each of said containers, means for sealing said lids on said containers, means for discharging filled containers from said conveyor, means for driving said conveyor and container dispenser means and food product introducing means and lid dispensing means and said means for discharging filled containers from a common shaft and in synchronization with each other, the lower run of said conveyor being immersed in a cleaning solution in said tank to clean said conveyor, said means for discharging filled containers including a container raising cam for partially raising the containers out of the openings in said flights, a receiver plate normally disposed within said tank means, said receiver plate having a notch located in alignment with the containers on said conveyor and adapted to receive said containers, a pair of fixed support rods associated with each notch in said receiver plate and adapted to support the containers when the containers are discharged from said conveyor.

2. The structure of claim 1 in which said receiver plate is mounted on a cross bar means, and support rods slidably supporting said cross bar means within said tank.

3. The structure of claim 1 including an air-tight housing mounted on said tank for packaging food products under sterile conditions.

4. In an apparatus for packaging food, drugs, and other products having an endless conveyor including a plurality of flights extending transversely of its path of travel with at least one opening in each of the flights to receive and transport a container to be filled, means for discharging containers from the conveyor after they have been filled, said discharging means including a container raising cam for partially raising the containers out of the openings in said flights, a receiver plate normally positioned adjacent the discharge end of the conveyor, said receiver plate having a notch located in alignment with the containers on said conveyor and adapted to receive said containers, a pair of fixed support rods associated with each notch in said receiving plate and adapted to support the containers when the containers are discharged from said conveyor, and means for reciprocating said receiver plate to move containers from said conveyor flights to said pair of fixed support rods.

5. The device as defined in claim 4 wherein said receiver plate is mounted on a cross bar means and said device includes support rods slidably supporting said cross bar means.

6. The device as defined in claim 5 wherein said support rods have tapered free end portions located adjacent said conveyor whereby containers removed from said conveyor flights by said receiver plate are guided along said tapered portions of said support rods onto the rods and remain on the rods as the receiver plate is reciprocated back towards the conveyor.

7. The device as defined in claim 6 wherein said means for reciprocating said receiver plate is driven with said conveyor from a common drive shaft in synchronism with said conveyor.

* * * * *